Oct. 16, 1934.  L. E. TOMBAL  1,976,861
PROTRACTOR DEVICE
Filed Aug. 18, 1932  3 Sheets-Sheet 1

Léon Emile Tombal
INVENTOR

Oct. 16, 1934.  L. E. TOMBAL  1,976,861
PROTRACTOR DEVICE
Filed Aug. 18, 1932   3 Sheets-Sheet 2

Léon Emile Tombal
INVENTOR
his Attorney

Oct. 16, 1934.　　　L. E. TOMBAL　　　1,976,861
PROTRACTOR DEVICE
Filed Aug. 18, 1932　　　3 Sheets-Sheet 3

Léon Emile Tombal
INVENTOR
his Attorney.

Patented Oct. 16, 1934

1,976,861

UNITED STATES PATENT OFFICE 1,976,861

PROTRACTOR DEVICE

Léon Emile Tombal, Meulan, France

Application August 18, 1932, Serial No. 629,252
In France August 24, 1931

1 Claim. (Cl. 33—111)

The present invention relates to a protractor for measuring angles, said protractor being chiefly characterized by the fact that it comprises, in combination:

A rectilinear graduated scale whose different scale-divisions represent the respective intersections of the radii drawn from a common centre and spaced at equal angles, with the diagonal of a given square serving as a basis and being of any suitable size adapted to the scale desired for the graduations, the apex of said square, situated opposite the said diagonal constituting said common centre of the radii; a line, starting from the base line of the scale and making an angle of 45° with the same and two indicating lines, whose spacing corresponds to the length of the side of the said square.

The protractor thus constituted will permit angle measuring from 0 to 90° in a single quadrant.

The said protractor preferably carries two parallel scales, combined with an indicating line, and with a set consisting of two other indicating lines, one of the said scales being employed for the right-hand quadrant and the other for the left-hand quadrant, so that in this manner the angles can be measured in either of these quadrants.

According to a preferred embodiment another scale can be formed by subtracting, from 180°, the indications of one of the scales abovementioned providing thus for the direct reading of the obtuse angles between 90° and 180°.

The said protractor may obviously be combined, as will be further stated, with suitable devices such as a graduated measuring rule, a triangular or like scale, a jointed measuring scale, a triangle, a T-square or double T-square, a builder's triangle, etc.

In the accompanying drawings, which are given solely by way of example:

Figure 3:
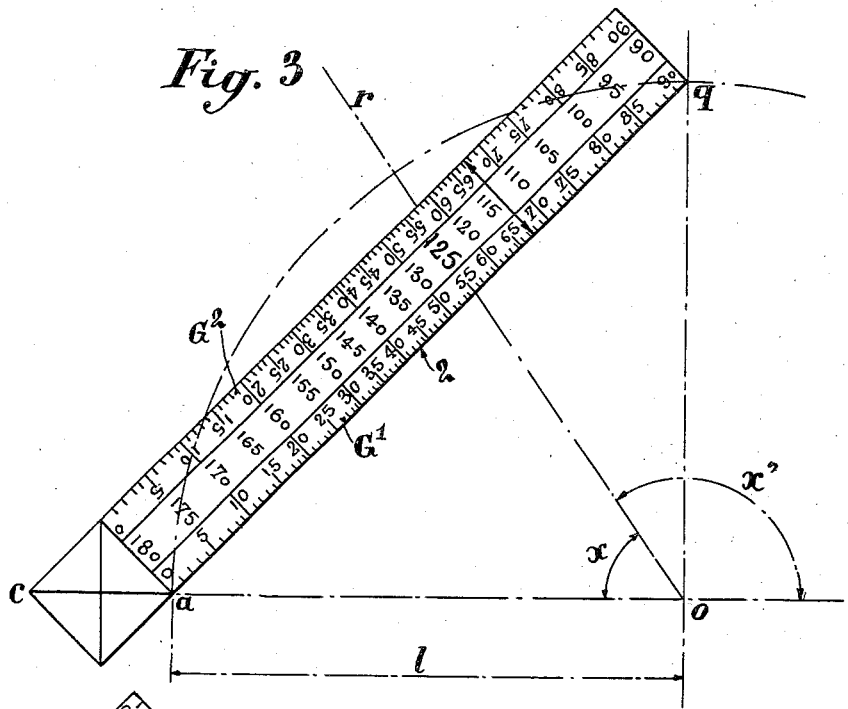
Figure 4:
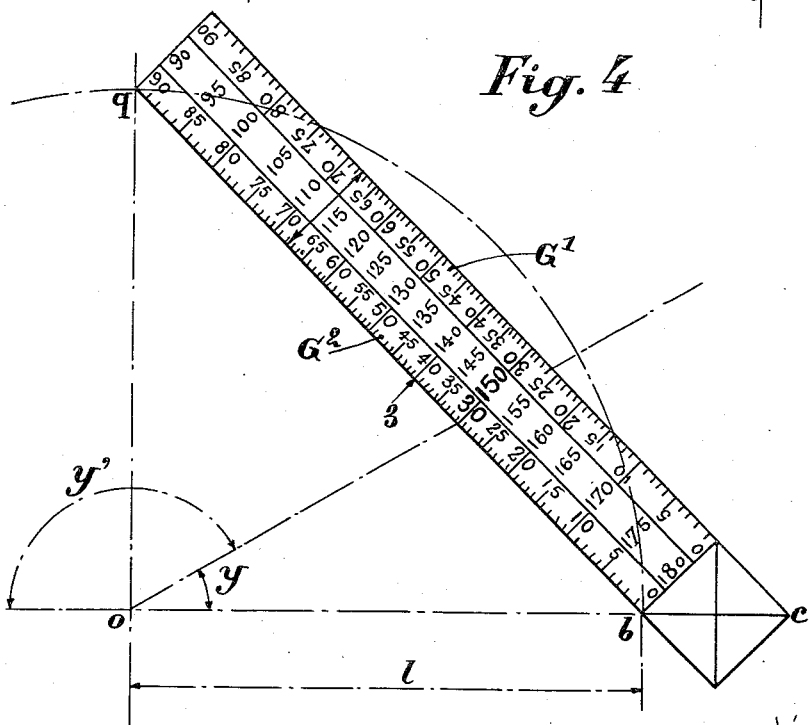
Figure 5:
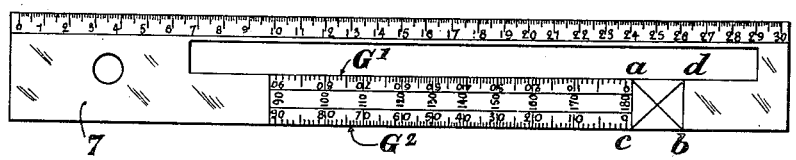

Fig. 3 relates to the method of use of the protractor, for the measurement of an acute angle situated in the upper left-hand quadrant, or of its complementary obtuse angle;

Fig. 4 relates to an analogous method, for the measurement of an acute angle situated in the upper right-hand quadrant, or of the complementary obtuse angle; and Fig. 5 a graduated rule comprising the aforesaid improvements.

Figure 1:
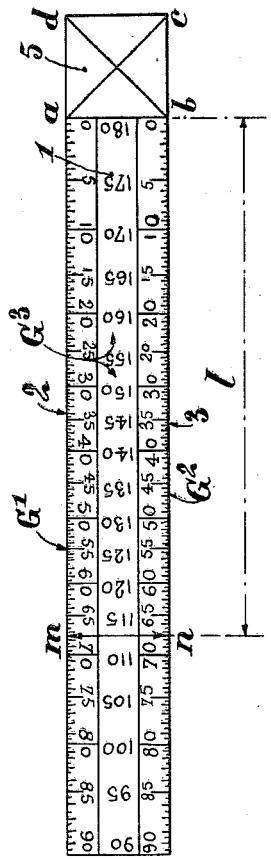
Fig. 1 represents a protractor in conformity to the invention and formed, for example, with a square having ten centimeters on a side.

In the form of construction shown in Fig. 1, the protractor consists of a flat member or ruler 1 of any suitable length and width, and made of any adequate material such as metal, wood, cardboard, celluloid, etc. which may be opaque, transparent, or translucent. The member 1 will preferably have but a small thickness, or its edges 2 and 3 may be bevelled. The said member or ruler is graduated, on its respective edges, at $G^1$ and $G^2$, from 0° to 90°, commencing from a common base line $ab$. On the other side of this line, the protractor comprises a part 5 carrying two indicating lines $ac$ and $bd$, each of which makes an angle of exactly 45° with the respective graduated edges from whose zero point they start.

In the lengthwise direction, the protractor carries a graduated scale $G^3$, formed by subtraction from 180° the numbers of one of the two scales $G^1$ and $G^2$.

The protractor is further provided with two indicating lines consisting, in the present case, of the base line $ab$ and the line $mn$. The distance between these lines has a given value $l$, for instance 10 centimeters. These two lines, which are separated by distance $l$, might also be situated at any suitable points on the member 1.

Figure 2:
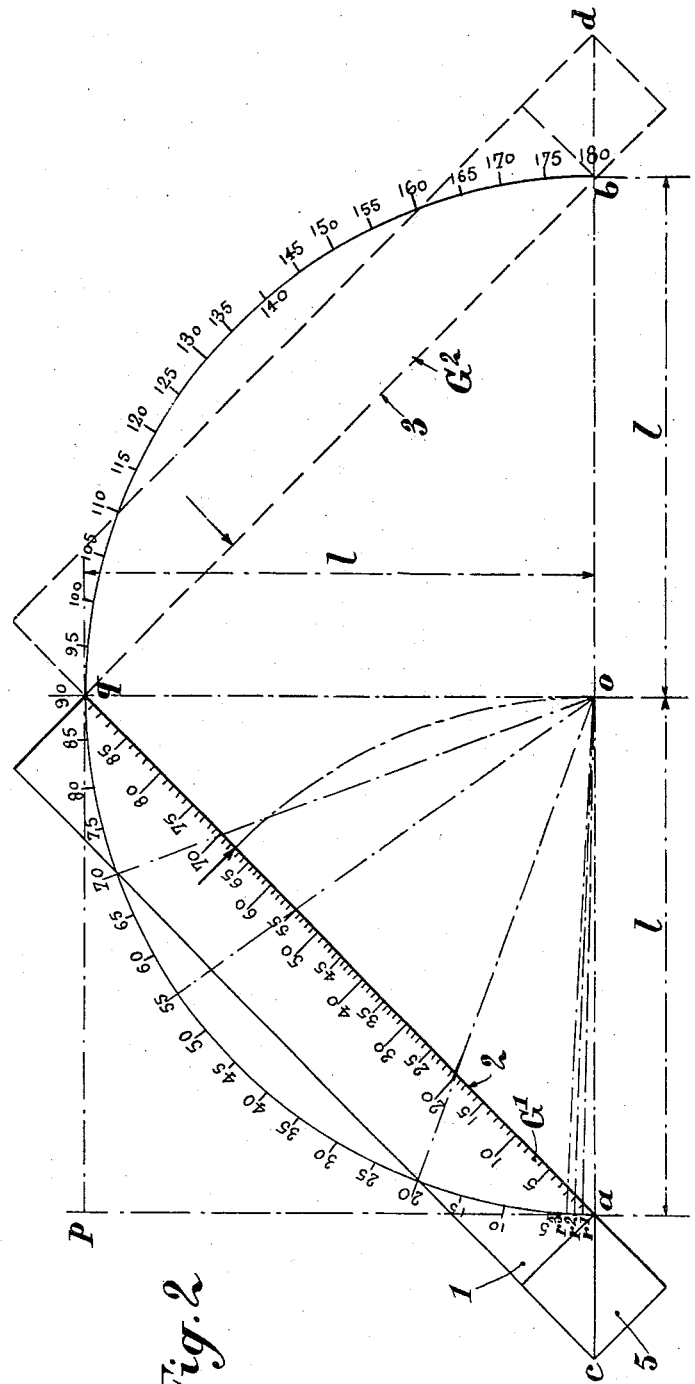
Fig. 2 is a diagram showing the method of construction of the said protractor.

The scales $G^1$—$G^2$ are graduated in the following manner (Fig. 2).

A base line $Oa$ having the length $l$ is taken, and upon it is laid out a square $o\ a\ p\ q$; then the diagonal $aq$ is drawn, the edge 2 of the ruler 1 to be graduated being placed in coincidence with said diagonal. From the point $o$ are drawn the radii $or^1$, $or^2$, $or^3$, etc., spaced at an angle of 1 degree, for instance and finally the points of intersection of these radii with the diagonal $aq$, that is, with the edge of the ruler 1, are marked.

It is thus observed that when the ruler is placed in its said position of use, it is possible to read upon the scale $G^1$ all angles from 0 to 90° which are included in the upper left-hand quadrant.

A like method is employed for marking the scale $G^2$, using for this purpose a square whose base is $l$ and noting the points of intersection of the radii drawn from $o$, said radii being spaced at the constant angle of 1°, with the diagonal $bq$, that is, with the side 3 of the ruler 1 which coincides with this diagonal.

The said device is employed in the following manner. It is desired for instance to measure the angle $x$, inferior to 90°, situated in the lefthand quadrant (Fig. 3). It is required in the first place to locate the point $a$ of the said square which is to coincide with the zero point of the scale $G^1$, and this point $a$ is determined by the use of the indicating lines $ab$, $mn$, which are separated by the distance $l$ equal to the base line of said square. After locating the point $a$, the indicating line $ab$ is made to coincide with an extension of the side $oa$ of the angle to be measured. Obviously, the scale $G^1$ has the proper position according to the diagonal $aq$ of the said square. The intersection of the radius $or$ with the scale $G^1$ will give the desired indication, for instance 55°. The value of the obtuse angle $x'$ is given by the central scale: 180°−55°=125°.

For an acute angle $y$ (Fig. 4) situated in the right-hand quadrant, the same method is followed, using the scale $G^2$ and the corresponding indicating line $bc$.

The measurement of an angle greater than 180° will be effected in like manner, by measuring, in one of the two other quadrants, an angle which does not exceed 180°, and by adding 180° to the resulting value.

The protractor can obviously be employed to lay out any triangle, when one side, the vertex, and the value of the angle are known.

With the protractor placed in any one of the positions shown in Figs. 2 to 4, upon the known side, and at a distance $x$ from the given vertex or centre, the stated value of the angle is found upon the scale $G^1$ or $G^2$, and the corresponding point is connected with the centre $o$.

The said protractor may be combined with various devices, such as a flat rule 7 (Fig. 6).

Obviously, the said invention is not limited to the forms of construction herein described and represented, which are given solely by way of example. The said protractor may be combined with any suitable devices. It will be noted that the rectilinear protractor, considered alone, is much smaller than the usual semi-circular protractor, and hence it can be given a considerable length (and this can be still further increased by making it of the folding type) and in this manner it enables the measurement of angles with great accuracy, such as cannot be obtained with a semi-circular protractor, for in such case this would have an excessive size. Furthermore, it is observed that the combination of the said protractor with other devices such as have been above indicated, would form an apparatus by which the protractor, which has hitherto been an independent device, may be now eliminated as such.

Having now described my invention what I claim as new and desire to secure by Letters Patent is:

A protractor device comprising a straight-edge having a protractor scale extending along a longitudinal edge thereof, the distance between the graduations of said scale being determined by the intersection of lines radiating from an apex of a square with a diagonal of the square, a line disposed at an angle of 45° to the said longitudinal edge and radiating from the zero graduation of said scale, and a reference mark spaced longitudinally of said straight-edge from said zero graduation of distance equal to the length of a side of said square.

LÉON EMILE TOMBAL.